United States Patent
Iki et al.

(10) Patent No.: US 7,429,550 B2
(45) Date of Patent: Sep. 30, 2008

(54) HYDROGENATION CATALYST FOR HYDROCARBON OIL AND PROCESS FOR HYDROGENATION USING THE CATALYST

(75) Inventors: Hideshi Iki, Yokohama (JP); Kazuaki Hayasaka, Yokohama (JP); Kazuo Fukazawa, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 105 days.

(21) Appl. No.: 11/567,374

(22) Filed: Dec. 6, 2006

(65) Prior Publication Data
US 2007/0084753 A1 Apr. 19, 2007

Related U.S. Application Data

(63) Continuation of application No. PCT/JP2005/010301, filed on May 31, 2005.

(30) Foreign Application Priority Data

Jun. 7, 2004 (JP) .............................. 2004-168951

(51) Int. Cl.
- *B01J 21/12* (2006.01)
- *B01J 27/18* (2006.01)
- *C10G 47/18* (2006.01)
- *C10G 47/20* (2006.01)
- *C10G 45/12* (2006.01)

(52) U.S. Cl. .................. 502/210; 502/211; 502/74; 208/111.3; 208/143

(58) Field of Classification Search ............. 208/111.3, 208/143; 502/210, 211, 74
See application file for complete search history.

(56) References Cited

U.S. PATENT DOCUMENTS

| | | | |
|---|---|---|---|
| 6,903,048 B2 * | 6/2005 | Iwata et al. | 502/211 |
| 7,078,364 B2 * | 7/2006 | Haw et al. | 502/214 |

FOREIGN PATENT DOCUMENTS

| | | |
|---|---|---|
| JP | 06-127931 A | 5/1994 |
| JP | 07-197039 A | 8/1995 |
| JP | 08-281117 A | 10/1996 |
| JP | 10-277396 A | 10/1998 |
| JP | 2002-028491 A | 1/2002 |

OTHER PUBLICATIONS

Hideki Godo et al, "Effect of Addition Method of Phosphorus on Alumina-supported NiMoP Catalysts—Hydrodesulfurization of 4,6 Dimethyldibenzothiophene and Characterization Using MAS NMR", Journal of the Japan Petroleum Institute, 47(2):115-120 (2004).

* cited by examiner

*Primary Examiner*—David M Brunsman
(74) *Attorney, Agent, or Firm*—Panitch Schwarze Belisario & Nadel LLP

(57) ABSTRACT

A hydrogenation catalyst for a hydrocarbon oil, includes an inorganic porous support composed of at least the oxides of aluminum, phosphorus, and silicon, and supporting at least one active metal selected from the metals of Group 8 of the periodic table, at least one active metal selected from the metals of Group 6 of the periodic table, and phosphorus, the phosphorus chemical shift value of the inorganic support determined by $^{31}$P-CPMAS-NMR having the peak within the range of 0 to −20 ppm. The catalyst can achieve an extremely high level of hydrogenation wherein the hydrocarbon is decreased in sulfur content to 10 ppm by mass or less and in nitrogen content to 3 ppm by mass or less.

9 Claims, 1 Drawing Sheet

HYDROGENATION CATALYST FOR HYDROCARBON OIL AND PROCESS FOR HYDROGENATION USING THE CATALYST

CROSS-REFERENCE TO RELATED APPLICATIONS

This application is a Continuation of International Application No. PCT/JP2005/010301, filed May 31, 2005, which was published in the Japanese language on Dec. 22, 2005, under International Publication No. WO/2005/120706 A1, the disclosure of which is incorporated herein by reference.

BACKGROUND OF THE INVENTION

The present invention relates to hydrogenation catalysts for hydrocarbon oils and processes for hydrogenation and more particularly to a hydrogenation catalyst which is effective in hydrodesulfurization of petroleum hydrocarbons containing a gas oil fraction or a kerosene fraction and a process for hydrogenation using the catalyst.

In recent years, awareness of environmental issues and air pollution has been raised, and particularly, has been directed to sulfur compounds contained in fuels used for transportation applications. For example, gasoline engines have been strongly demanded to be improved in fuel efficiency not only in the sense of resource conservation or economical factors but also in the sense of a reduction in carbon dioxide emissions. Therefore, the development and promotion of new combustion systems such as lean burn engines and direct gasoline-injection engines have been progressed under these situations. However, the components constituting the exhaust gas discharged from these engines are not always the same as those to be treated with the conventional ternary exhaust gas treating catalysts, on which further improvements have been required. It is indicated that the sulfur compounds contained in gasoline adversely affect such newly developed exhaust gas treatment systems or catalysts. Currently, the naphtha fraction produced from a fluid catalytic cracking (FCC) unit processing mainly a vacuum gas oil fraction as a feedstock has been used as a base gasoline at a fair percentage. In order to decrease the sulfur content in gasoline pool, it is necessary to decrease the sulfur content of the gasoline fraction produced in FCC. It is, therefore, necessary to decrease the sulfur content of a final gasoline by any of or combination of decreasing of the sulfur content of the vacuum gas oil, desulfurizing in an FCC apparatus, and decreasing of the sulfur content of the FCC gasoline.

On the other hand, in addition to chemical substances such as SOx and NOx, fine particles so-called "particulates" are contained in the exhaust gas discharged from a diesel engines using gas oil and are in danger of harming the human health. It is proposed to mount a particulate trap filter such as DPF or a system capable of burning particulates downstream of an engine in order to remove the particulates. The use of such devices in diesel powered automobiles have also been studied. Furthermore, reduction catalysts for removing NOx are developed. However, these devices and catalysts are likely to be poisoned or deteriorated with SOx produced due to combustion of sulfur compounds in fuel. Such deterioration of the exhaust gas purification system or catalyst is a serious problem for diesel powered automobiles such as trucks that run longer distance than gasoline-fueled automobiles. In order to solve this problem, it is strongly demanded to decrease the sulfur content in gas oil as much as possible. Gas oil used as a diesel fuel contains a fraction classified as a kerosene fraction by its boiling range in such a certain percentage that the product properties are optimally maintained. Therefore, it is necessary to decrease the sulfur content both in the kerosene fraction and the gas oil fraction so as to decrease the total sulfur content in gas oil used as fuel. Furthermore, it has been required to decrease the aromatic content in fuel oil, regarded as substances responsible for causing the generation of particulates. A kerosene fraction used as fuel for various heating devices such as stoves can be decreased in the amount of sulfur oxide or the like which is harmful, by decreasing the sulfur content. The generation of such harmful substances gives directly significant influences to the human body because most of these heating devices are used indoor.

The kerosene fraction, gas oil fraction and vacuum gas oil fraction produced by distilling crude oil or cracking fuel oil generally contain 0.1 to 3 percent by mass of sulfur compounds and thus are usually used as a base gas oil after being hydrodesulfurized. The main sulfur compounds contained in these fractions are thiophene, benzothiophene, dibenzothiophene, and derivatives thereof. Each of these fractions contains a certain amount of sulfur compounds with a relatively poor reactivity in its heavy portion. For example, the gas oil fraction contains alkyl-substituted dibenzothiophenes having a plurality of alkyl groups as substituents, such as 4,6-dimethylbenzothiophene that are poor in reactivity and inhibit the desulfurization of the fractions from proceeding to a low sulfur level of 10 ppm by mass. It is presumable that the activating function of a catalyst required for removal of such sulfur compounds will be different from that of a catalyst with the conventional activation range.

Furthermore, the gas oil fraction contains several hundreds ppm by mass of nitrogen compounds. Such nitrogen compounds are known as substances inhibiting hydrodesulfurization because they are adsorbed to the desulfurization active sites on a catalyst competitively with sulfur compounds. It is generally pointed out that denitrogenation reaction proceeds associated with hydrogenation of aromatic hydrocarbons, and thus the higher hydrogenation activity the more the catalyst is advantageous.

Hydrogenation catalysts commonly used for petroleum refining comprise cobalt, or nickel and molybdenum, supported on an inorganic porous support. In order to further improve the desulfurization activity of such catalysts, various inorganic porous supports have been studied in terms of their materials and physical properties. Alumina is typically exemplified as an inorganic porous support. However, other than alumina, Japanese Patent Laid-Open Publication No. 7-197039 proposes a support comprising zeolite that is crystalline and has a large surface area and acidic properties, and Japanese Patent Laid-Open Publication No. 6-127931 proposes a support containing silica. Further, Japanese Patent Laid-Open Publication No. 8-28117 proposes a support containing silica and supporting phosphorus together with active metals.

It is presumable that a support containing alumina and silica has a large surface area and forms a slight number of acid sites. There is a possibility that these acid sites facilitate the desulfurization activity by giving some influences on the desulfurization active sites. On the other hand, it is generally known that phosphorus acts together with active metals and gives influences on the dispersion and active site structure formation of the active metals. However, the mechanism of the action is so complicated that the physical properties of alumina, silica, and phosphorus suitable for forming a desulfurization active site exhibiting a high activity have not been explicit well. The physical properties of these components for enhancing the denitrogenation activity has not become apparent yet as well. The conventional desulfurization catalysts are not sufficient in activity to achieve an extremely high depth of hydrogenation at which a fuel is decreased in sulfur content to 10 ppm by mass or less and in nitrogen content to 3 ppm by mass or less, respectively. It is, therefore, necessary to control the physical properties of the catalyst more specifically and more precisely.

BRIEF SUMMARY OF THE INVENTION

The present invention has an object to provide a catalyst having high desulfurization and denitrogenation activities for hydrogenating hydrocarbon oils and a process for hydrogenating hydrocarbon oils using the catalyst.

In a hydrodesulfurization reaction of sulfur compounds having a poor desulfurization reactivity and a hydrodenitrization reaction of nitrogen compounds, a pathway, through which aromatic hydrocarbons are hydrogenated plays an important role as well as a pathway, through which sulfur atoms and nitrogen atoms are directly drawn from sulfur compounds and nitrogen compounds, respectively. As a result of extensive studies carried out by the inventors, the present invention was accomplished by their finding that an inorganic porous support comprising at least the oxides of aluminum, phosphorus, and silicon and having a phosphorus chemical shift value determined by $^{31}$P-CPMAS-NMR within a specific range renders it possible to improve the activities through the aforesaid direct drawing pathway and hydrogenation pathway, thereby effectively accomplishing the object of the present invention.

That is, the present invention relates to a hydrogenation catalyst for hydrocarbon oils, comprising an inorganic porous support composed of at least the oxides of aluminum, phosphorus, and silicon, and supporting at least one active metal selected from the metals of Group 8 of the periodic table, at least one active metal selected from the metals of Group 6 of the periodic table, and phosphorus, the phosphorus chemical shift value of the inorganic support determined by $^{31}$P-CPMAS-NMR having the peak within the range of 0 to −20 ppm.

The present invention also relates to a process for hydrogenating hydrocarbon oils using the aforesaid catalyst.

The hydrocarbon oil preferably contains a gas oil fraction.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
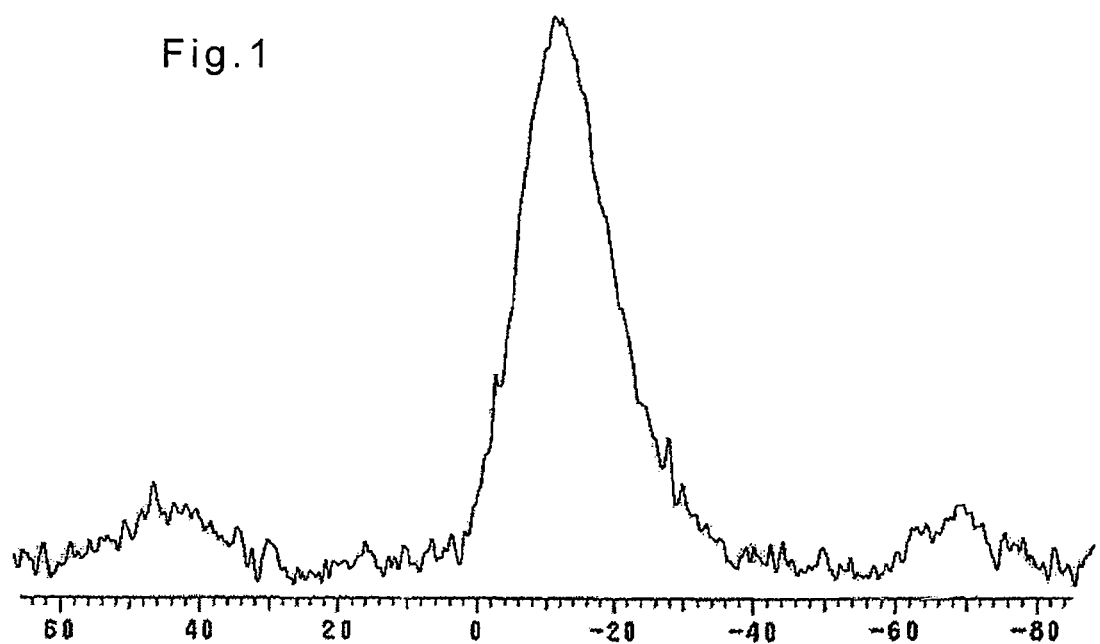
FIG. 1 shows the $^{31}$P-CPMAS-NMR spectra of the molded support of Catalyst 1.

The catalyst of the present invention comprises a support formed from an inorganic porous substance composed of at least the oxides of aluminum, phosphorus, and silicon. Aluminum element, phosphorus element, and silicon element form a porous structure as they are each in an oxide state, respectively.

The inorganic porous support used in the present invention has a phosphorus chemical shift value determined by $^{31}$P-CPMAS-NMR having the peak within the range of 0 to −20 ppm, preferably −5 to −15 ppm, and more preferably −9 to −11 ppm. "$^{31}$P-CPMAS-NMR" is the abbreviation of "Cross Polarization Magic Angle Spinning Nuclear Magnetic Resonance" and is Nuclear Magnetic Resonance (NMR) spectroscopy in combination with Cross Polarization (CP) and Magic Angle Spinning (MAS). In NMR, an atom's nucleus possessing a magnetic moment is placed in a magnetic field (external magnetic field) and then subjected to electromagnetic wave radiation with an adequate frequency (radio-frequency wave) so as to monitor the absorption of electromagnetic energy (nuclear magnetic resonance absorption) associated with transition of the nucleus energy created by the radiation. In cross polarization (CP), the proton in the object sample is excited, and a radio frequency wave fulfilling specific conditions is irradiated to the sample during which magnetization is transferred from the proton to the object atom's nucleus using the dipole interaction between the object atom's nucleus and the proton. This cross polarization enables an atomic nucleus which is hardly monitored due to its low magnetic susceptibility to be monitored through NMR. Magic angle spinning (MAS) is a typical technique often used in solid-state NMR spectroscopy. In this technique, a sample is held at a special angle to the applied magnetic field and spun at an angular high velocity to average out the anisotropy of the object atom's nucleus for easy analysis thereby providing a high resolution spectrum. The chemical shift value in NMR spectroscopy is a proportion ($\delta$ value) of the difference between the resonance frequency (Larmor frequency) of the nucleus of a specific reference substance and the resonance frequency of the nucleus in a sample to the Larmor frequency of the spectrometer and measured in parts per million (ppm).

The inventors have not necessarily come up with a concrete explanation as to how the specific chemical properties of the phosphorus atoms contained in the support and exhibiting a specific chemical shift in $^{31}$P-CPMAS-NMR gives influences on desulfurization activity. It is, however, presumable that since CPMAS utilizes cross polarization with protons, some interaction exists between the phosphorus and the neighboring protons, and under such an environment, the phosphorus and/or the protons play important roles for the formation of effective active points as well as for the progress of a desulfurization reaction. The "chemical shift value" used herein denotes the shift value at the peak top for phosphorus appearing $^{31}$P-CPMAS-NMR. The chemical shift value reflects a certain electronic environment of the object atom's nucleus. If a chemical shift value is not in the range defined by the present invention, it means that the phosphorus atoms and the environment in the vicinity thereof are not under circumstances wherein they can exhibit advantageous effects for a desulfurization reaction. Therefore, the catalyst can not exhibit sufficient desulfurization activity and thus fail to attain the advantageous effects achieved by the present invention.

The catalyst of the present invention comprising the aforesaid inorganic porous support supporting thereon at least one active metal selected from the metals of Group 8 of the periodic table, at least one active metal selected from the metals of Group 6 of the periodic table, and phosphorus has a phosphorus chemical shift value in $^{31}$P-CPMAS-NMR, the peak of which is in the range of preferably 0 to −20 ppm, more preferably −5 to −15 ppm, and even more preferably −9 to −11 ppm.

It is presumable that the existence of the peak in the catalyst supporting the active metals allows the catalyst to exhibit the above-described advantageous effects more significantly.

There is no particular restriction on the method of preparing the oxide of aluminum (alumina) mainly composing the support. For example, alumina may be prepared by neutralizing an aluminum salt such as aluminum sulfate and aluminate, or prepared through an alumina intermediate produced by hydrolyzing aluminum amalgam or aluminum alcoholate. Alternatively, commercially available alumina intermediates or boehmite powder may be used.

There is no particular restriction on the method of preparing the oxide of phosphorus. A method is usually employed in which phosphoric acid or an alkali salt thereof is added to alumina upon preparation thereof. For example, phosphorus may be added to an aluminum aqueous solution, which is then formed into an aluminum oxide gel containing phosphorus, or may be added to a prepared aluminum oxide gel. Alternatively, phosphorus may be added at the step of kneading a mixture of water or an acid aqueous solution and a commercially available alumina intermediate or boehmite powder. Preferably, phosphorus is contained in an aluminum oxide gel during the process of preparation thereof.

There is no particular restriction on the method of preparing the oxide of silicon (silica). A method is usually employed in which silica sol, sodium silicate, or silicic acid is added to alumina upon preparation thereof. For example, silicon may be added to an aluminum aqueous solution which is then formed into an aluminum oxide gel containing silicon, or may be added to a prepared aluminum oxide gel. Alternatively, silica may be added at the step of kneading a mixture of water or an acid aqueous solution and a commercially available alumina intermediate or boehmite powder. Preferably, silicon is contained in an aluminum oxide gel during the process of preparation thereof.

The content of aluminum in the inorganic porous support is preferably 80 percent by mass or more and more preferably 85 percent by mass or more in terms of oxide on the basis of the weight of the support. Alumina is a porous support providing the catalyst with such a suitable pore volume that in particular hydrocarbon molecules with a boiling range of 140 to 380° C. diffuse. Alumina of less than 80 percent by mass would be difficult in forming a support with a sufficient support pore volume.

The content of phosphorus in the inorganic porous support is preferably from 0.5 to 10 percent by mass, more preferably from 1 to 9 percent by mass, and particularly preferably 3 to 8 percent by mass, in terms of oxide on the basis of the support weight. Phosphorus of less than 0.5 percent by mass causes the resulting catalyst to exert insufficient desulfurization activity, while phosphorus of more than 10 percent by mass would increase the acidic properties of the support and thus decompose hydrocarbon oils, possibly leading to a reduction in yield and a reduction in the activity of the catalyst caused by the formation of coke associated with the decomposition.

The content of silicon contained in the inorganic porous support is preferably from 1 to 12 percent by mass, more preferably from 1.5 to 10 percent by mass, and particularly preferably from 2 to 5 percent by mass, in terms of oxide, on the basis of the weight of the support. Silica of less than 1 percent by mass would cause insufficient interaction with aluminum or phosphorus in the state of oxide and thus causes the resulting catalyst to exert insufficient desulfurization activity, while silica of more than 12 percent by mass would cause the remarkable emergence of acidic sites and thus result in a decrease in the yield of a gas oil fraction.

In addition to alumina, phosphorus, and silicon, the support may contain at least one element selected from Ti, Zr, Mg, Ca, and B, in the form of the oxide. The support contains preferably Ti or Zr and more preferably Ti. Although the mechanism exhibiting advantageous effects attained by addition of these elements have not been elucidated, it is assumed that these elements form a complex oxide state together with aluminum, phosphorus, and silicon. It has been confirmed that addition of these elements can improve the desulfurization activity of the catalyst. There is no particular restriction on the method of allowing the support to contain an element selected from Ti, Zr, Mg, Ca, and B. For example, a method may be employed in which the oxide, hydroxide, nitrate, sulfate or any other salt compound of any of these elements is added in the form of a solid or a solution to alumina at any stage of preparation thereof. For example, the oxide, hydroxide, nitrate, sulfate or any other salt compound of any of these elements may be added to an aluminum aqueous solution, which is then formed into an aluminum oxide gel containing the element, or may be added to a prepared aluminum oxide gel. Alternatively, it may be added at the stage of kneading a mixture of water or an acid aqueous solution and a commercially available alumina intermediate or boehmite powder. Preferably, the element is contained in an aluminum oxide gel during the process of preparation thereof.

The total amount of the oxides of aluminum, phosphorus, and silicon in the inorganic porous support is preferably 95 percent by mass or more on the basis of the weight of the support. The support may contain elements other than these elements in an amount of up to 5 percent by mass. However, the amount in excess of 5 percent by mass is not preferable because the desulfurization and denitrogenation activities may be reduced due to a reduction in the surface area or in the dispersity of the active metals.

The catalyst of the present invention contains at least one active metal selected from the metals of Group 8 of the periodic table and at least one active metal selected from the metals of Group 6 of the periodic table, supported on the above-described inorganic porous support.

Examples of the metals of Group 8 of the periodic table which are preferably used in the present invention include nickel and cobalt. Nickel and cobalt may be used alone or in combination.

There is an optimum range of the content of the Group 8 metal depending the ratio thereof to the Group 6 metal. However, the content is preferably from 0.5 to 8 percent by mass, more preferably from 0.8 to 6.5 percent by mass, and even more preferably 1 to 4.5 percent by mass in terms of oxide on the basis of the catalyst weight. The content of less than 0.5 percent by mass is not preferable because the desulfurization and denitrogenation activities is reduced. The content of more than 8 percent by mass is not also preferable because the effects of the Group 8 metal can not be expected anymore or rather reduced. It is assumed that this is because the structure of the desulfurization and denitrogenation active sites will change and thus adversely cause a reduction in the activities.

Examples of the metals of Group 6 of the periodic table which are preferably used in the present invention include molybdenum and tungsten. Particularly preferred is molybdenum.

The content of the Group 6 metal is preferably 19 percent by mass or more, more preferably 20 percent by mass, even more preferably 20.5 percent by mass, and most preferably 21 percent by mass or more in terms of oxide on the basis of the catalyst weight. The Group 6 metal of less than 19 percent by mass can not exert sufficient desulfurization and denitrogenation activities because the number of active sites is decreased. The total amount of the Group 8 metal and the Group 6 metal supported on the support is preferably 24 percent by mass or more, more preferably 24.5 percent by mass or more, and even more preferably 25 percent by mass or more in terms of oxide on the basis of the catalyst weight. The metals of less than 24 percent by mass would fail to exert a sufficient desulfurization activity because of the insufficient number of active sites.

There is no particular restriction on the combination of the Group 6 metal and the Group 8 metal. Examples of preferred combinations include cobalt-molybdenum, nickel-molybdenum, cobalt-nickel-molybdenum, and nickel-tungsten. Among these combinations, particularly preferred are cobalt-molybdenum, nickel-molybdenum, and cobalt-nickel-molybdenum.

The catalyst of the present invention supports phosphorus as an active component, in combination with the Group 6 metal and the Group 8 metal. There is no particular restriction on the method of allowing phosphorus to be supported. Phosphorus may be supported on the support together with a Group 8 metal and a Group 6A metal using a solution in which phosphorus coexists therewith or before or successively after these active metals are supported on the support. The content of phosphorus is preferably from 0.5 to 10 percent by mass, more preferably from 1 to 6 percent by mass, and even more preferably 2 to 5 percent by mass in terms of oxide on the basis of the catalyst weight. Phosphorus of less than 0.5 percent by mass reduces the desulfurization and denitrogenation activities because the Group 6 metal and the Group 8 metal aggregate or become a sulfide and thus fail to form active sites. Phosphorus of more than 10 percent by mass would cause a side reaction such as decomposition to progress.

There is no particular restriction on the method of allowing the Group 8 metal, the Group 6A metal, and phosphorus, which are the active components of the catalyst to be contained therein. Therefore, there may be used any conventional method employed when a desulfurization catalyst is produced. Generally, a method is preferably employed in which a support is impregnated with a solution of salts of the active metals. Alternatively, an equilibrium adsorption method, pore-filling method, or incipient-wetness method is also preferably used. For example, the pore-filling method is a method in which the pore volume of a support is measured in advance, and then the support is impregnated with the same volume of a metal salt solution. There is no particular restriction on the method of impregnating the support with a solution. Therefore, any suitable method may be used depending on the amount of the metals to be supported and physical properties of the support.

There is no particular restriction on the surface area of the hydrogenation catalyst of the present invention sought by the BET method using nitrogen. However, the surface area is preferably 295 m$^2$/g or smaller, more preferably 290 m$^2$/g or smaller, and even more preferably 285 m$^2$/g or smaller because the catalyst with a too wide surface area may fail to assure sufficient diffusion of hydrocarbon molecules in the pores.

The pore volume of the catalyst sought by the BET method using nitrogen is preferably 0.50 ml/g or smaller and more preferably 0.49 ml/g or smaller. The pore volume of larger than 0.50 ml/g indicates an increase in the void of the catalyst and thus would not provide a sufficient catalyst strength.

The present invention also relates to a process for hydrogenating hydrocarbon oils using the above-described hydrogenation catalyst. The hydrocarbon oils used in the present invention are preferably petroleum hydrocarbon oils. Examples of preferred petroleum hydrocarbon oils include kerosene, gas oil, and vacuum gas oil fractions. The petroleum hydrocarbons are more preferably those containing a kerosene fraction or a gas oil fraction and even more preferably those containing a gas oil fraction. The gas oil fraction may contain a straight gas oil fraction and further a thermally cracked gas oil and a catalytic cracked gas oil. However, the gas oil fraction contains a straight gas oil in an amount of preferably 50 percent by volume or more and more preferably 70 percent by volume or more. The thermally cracked gas oil and catalytic cracked gas oil contain more olefins and aromatic compounds than the straight gas oil. If the percentage of the thermally cracked gas oil and catalytic cracked gas oil increases, the gas oil fraction would be reduced in reactivity and the resulting oil would be deteriorated in color.

The hydrogenation catalyst of the present invention is suitable for desulfurization from sulfuric components such as thiophenes, benzothiophenes, and dibenzothiophenes. Examples of hydrocarbon oils containing such compounds include gas oil fractions containing 80 percent by volume or more of a fraction whose boiling point is in the range of 220 to 380° C. The distillation characteristics values indicated herein are those measured in compliance with the method described in JIS K 2254 "Petroleum products-Determination of distillation characteristics". The gas oil fractions described above generally contain 20 to 30 percent by volume of aromatic compounds, 0.8 to 2 percent by volume of sulfur compounds, and 100 to 500 ppm by mass of nitrogen compounds.

In the present invention, the above-described gas fraction is hydrogenated with the specific catalyst thereby decreasing the sulfur compound concentration to 10 ppm by mass or less, preferably 5 ppm by mass or less and the nitrogen compound concentration to 3 ppm by mass, preferably 1.5 ppm by mass. As described above, a fuel with a less sulfur compound is extremely advantageous in exhaust gas treatment and thus can dramatically improve the performance of an exhaust gas treatment device. When the sulfur compound concentration of the hydrogenated gas oil is in excess of 10 ppm by mass, the gas oil can not decrease the sulfur compounds in the final fuel for exhaust gas purification.

It is known that the nitrogen compounds are substances poisoning the catalyst used in hydrodesulfurization. If the nitrogen compounds are efficiently removed in the hydrodesulfurization process, the operation conditions of hydrodesulfurization can be eased and thus the cost thereof can be reduced. It is confirmed that hydrodesulfurization using the catalyst of the present invention proceeds extremely efficiently because the nitrogen compound concentration of the resulting oil can be decreased to 3 ppm or less. If the nitrogen compound concentration is more than 3 ppm by mass, the hydrodesulfurization in a reactor will be significantly inhibited from proceeding efficiently by the nitrogen compounds and thus require to be conducted at higher temperature or hydrogen partial pressure or for a longer time period during which the catalyst contacts the oil fraction. The term "sulfur content (sulfur compound content)" used herein denotes the content by mass of the sulfur compounds based on the total mass of a petroleum hydrocarbon measured in compliance with the method described in JIS K 2541 "Crude oil and petroleum products-Determination of sulfur content" or ASTM-D5453. The term "nitrogen content (nitrogen compound content)" used herein denotes the content by mass of the nitrogen compounds based on the total mass of a petroleum hydrocarbon measured in compliance with the method described in JIS K 2609 "Crude petroleum and petroleum products-Determination of nitrogen content" or ASTM-D4629 or D5762.

When the feedstock petroleum hydrocarbon oil is a gas oil fraction containing 80 percent by volume or more of a fraction, the boiling point of which is in the range of 220 to 380° C. and hydrodesulfurized using the catalyst of the present invention, the total content of the aromatic compounds with two or more rings can be decreased to 4 percent by volume or less, preferably 3.5 percent by volume or less, and more preferably 3 percent by volume. It is pointed out that the polycyclic aromatic compound is one of the substances causing the generation of particulates contained in the exhaust gas from a diesel engine. A gas oil with the content of the aromatic compounds with two or more rings in excess of 4 percent by volume is likely to facilitate the generation of particulates. The term "aromatic content (aromatic compound content)" used herein denotes the total content represented by volume percent of various aromatic compounds measured in compliance with a method described in a report entitled with JPI-5S-49-97 "Determination of Hydrocarbon Types-High Performance Liquid Chromatography" published by the Japan Petroleum Institute.

Furthermore, when a feedstock petroleum hydrocarbon is a gas oil fraction containing 80 percent by volume or more of a fraction, the boiling point of which is in the range of 220 to 380° C. and hydrogenated with the catalyst of the present invention, the color of the resulting oil determined by ASTM color standard can be made 1.0 or less. If the color is 1.0 or greater, the resulting gas oil becomes yellowish or brownish and thus is deteriorated in commercial value. It is noted that the coloration caused by hydrodesulfurization is relevant to the reaction temperature. However, the process of the present invention is not required to be conducted at such a high reaction temperature or under any other sever operation conditions and thus can produce a colorless gas oil that is commercially highly valuable. The term "ASTM color" used herein denotes a color determined by a method described in JIS K 2580 "Petroleum products-Determination of colour".

As an example of the conditions for hydrogenation of a gas oil fraction according to the present invention, the LHSV (Liquid Hourly Space Velocity) is in the range of preferably 0.3 to 2.0 hr$^{-1}$, more preferably 0.35 to 1.7 hr$^{-1}$, and even more preferably 0.4 to 1.2 hr$^{-1}$. If the LHSV is less than 0.3 hr$^{-1}$, an enormous plant investment for construction of the reactor or the like is required because the volume thereof must be extremely large in order to obtain a certain through put. If the LHSV is greater than 2.0 hr$^{-1}$, the desulfurization reaction does not proceed sufficiently and thus the catalyst fails to desulfurize or dearomatize the gas fraction because the time for which the catalyst contacts the gas fraction is shortened.

The hydrogen partial pressure is in the range of preferably 3 to 8 MPa, more preferably 3.5 to 7 MPa, and even more preferably 4 to 6.5 MPa. If the hydrogen partial pressure is less than 3 MPa, hydrogenation or dearomatization is not exerted. If the hydrogen partial pressure is greater than 8 MPa, an enormous plant investment for replacing the compressor or enhancing the strength of the reaction apparatus is required. The reaction temperature is in the range of preferably 300 to 380° C. If the reaction temperature is lower than 300° C., sufficient desulfurization or aromatic-hydrogenation reaction speed can not be attained. If the reaction temperature is higher than 380° C., the yield of the intended fraction is decreased due to the deterioration of the color of or decomposition of the resulting oil. The hydrogen/oil ratio is in the range of preferably 100 to 500 NL/L. The hydrogen/oil ratio indicates the ratio of the hydrogen gas flow rate to the feed stock flow rate. The larger the ratio, the more sufficiently hydrogen gas is supplied to the reaction system and more quickly the substances poisoning the catalyst active sites, such as hydrogen sulfide can be removed to the outside of the system. As a result, the reactivity tends to be improved. However, if the ratio is in excess of 500 NL/L, the reactivity is improved to a certain extent but thereafter will be less improved. Furthermore, an enormous plant investment for replacing the compressor may be required. If the ratio is smaller than 100 NL/L, the reactivity is reduced and thus the desulfurization or dearomatization reaction does not proceed sufficiently.

For the same reasons as described above, the feedstock to be hydrogenated by the process of the present invention may also be a kerosene fraction containing 80 percent by volume or more of a fraction, the boiling point of which is in the range of 140 to 280° C. The kerosene fraction generally contains 20 to 30 percent by volume of aromatic compounds, 0.5 to 2 percent by mass of sulfur compounds, and 50 to 500 ppm by mass of nitrogen compounds.

When high reaction temperatures or any other sever operation conditions are employed to proceed desulfurization of the kerosene fraction, the resulting kerosene may become yellowish and thus be deteriorated in commercial value similarly to the case for the gas oil fraction. However, the present invention can stably produce a kerosene with a high commercial value. Therefore, even when the kerosene fraction is mixed with a gas oil fraction in order to produce a diesel fuel, it can get rid of a concern that the commercial value of the diesel fuel may be declined.

As an example of the conditions for hydrogenation of a kerosene fraction according to the present invention, the hydrogen partial pressure is in the range of preferably 2.5 to 6 MPa, more preferably 2.7 to 5.5 MPa, and even more preferably 3 to 5 MPa. If the hydrogen partial pressure is less than 2.5 MPa, not only the hydrogenation or dearomatization effect is not exerted, but also the resulting oil tends to be deteriorated in color. If the hydrogen partial pressure is greater than 8 MPa, an enormous plant investment for replacing the compressor or enhancing the strength of the reaction apparatus is required. The reaction temperature is in the range of preferably 270 to 350° C. and more preferably 280 to 330° C. If the reaction temperature is lower than 270° C., a sufficient desulfurization or aromatic-hydrogenation reaction speed can not be attained. If the reaction temperature is higher than 350° C., the yield of the intended fraction is decreased due to the deterioration of the color of or decomposition of the resulting oil. The hydrogen/oil ratio is in the range of preferably 30 to 300 NL/L and more preferably 50 to 200 NL/L. The hydrogen/oil ratio indicates the ratio of the hydrogen gas flow rate to the feed stock flow rate. The larger the ratio, the more sufficiently hydrogen gas is supplied to the reaction system and more quickly the substances poisoning the catalyst active sites, such as hydrogen sulfide can be removed to the outside of the system. As a result, the reactivity tends to be improved. However, if the ratio is in excess of 300 NL/L, the reactivity is improved to a certain extent but thereafter will be less improved. Furthermore, an enormous plant investment for replacing the compressor or the like is required. If the ratio is smaller than 30 NL/L, the reactivity is reduced and thus the desulfurization or dearomatization reaction does not proceed sufficiently.

For the same reasons as described above, the feedstock to be hydrogenated by the process of the present invention may also be a vacuum gas oil fraction containing 80 percent by volume or more of a fraction, the boiling point of which is in the range of 350 to 590° C., produced from a vacuum distillation apparatus. The vacuum oil fraction generally contains 1.0 to 3 percent by mass of sulfur compounds and 100 to 1200 ppm by mass of nitrogen compounds. The hydrogenation catalyst of the present invention can allow a vacuum gas oil fraction containing more sulfur compounds and more nitrogen compounds than the kerosene fraction or the gas oil fraction to be desulfurized or denitrified efficiently. The hydrogenated vacuum gas oil fraction is generally used as a feedstock for a fluid catalytic cracking (FCC) apparatus. If the vacuum gas oil fraction is desulfurized and denitrified sufficiently, it is expected that the fraction can not only decrease the sulfur content of the gasoline fraction produced from the fluid catalytic cracking apparatus but also enhance the gasoline yield.

As an example of the conditions for hydrogenation of a vacuum gas fraction according to the present invention, the hydrogen partial pressure is in the range of preferably 3 to 12 MPa, more preferably 5.5 to 11.5 MPa, and even more preferably 6 to 10 MPa. If the hydrogen partial pressure is less than 3 MPa, the hydrogenation or dearomatization effect is not exerted, and a stable long term operation may not be carried out because the catalyst will be significantly reduced in activity. If the hydrogen partial pressure is greater than 12 MPa, an enormous plant investment for replacing the compressor or enhancing the strength of the reaction apparatus is required. The reaction temperature is in the range of preferably 330 to 450° C. and more preferably 340 to 440° C. If the reaction temperature is lower than 330° C., a sufficient desulfurization or denitrogenation reaction speed can not be attained. If the reaction temperature is higher than 450° C., the formation of coke is facilitated, leading to a reduction in the activity of the catalyst, and the yield of the intended fraction may be decreased due to the decomposition thereof. The hydrogen/oil ratio is in the range of preferably 100 to 600 NL/L and more preferably 200 to 550 NL/L. The hydrogen/oil ratio indicates the ratio of the hydrogen gas flow rate to the feed stock flow rate. The larger the ratio, the more sufficiently hydrogen gas is supplied to the reaction system and more quickly the substances poisoning the catalyst active sites, such as hydrogen sulfide can be removed to the outside of the system. As a result, the reactivity tends to be improved. However, if the ratio is in excess of 600 NL/L, the reactivity is improved to a certain extent but thereafter will be less improved. Furthermore, an enormous plant investment for replacing the compressor may be required. If the ratio is smaller than 100 NL/L, the reactivity is reduced and thus the desulfurization or dearomatization reaction does not proceed sufficiently.

When hydrogenation is carried out, the catalyst is preferably subjected to pre-sulfidization. There is no particular restriction on the conditions for the pre-sulfidization. Generally, a method has been employed in which a catalyst whose active metals such as a Group 6 metal and a Group 8 metal are in the form of the oxide is loaded into a reactor and then the active metals are sulfided with sulfur compounds contained in a petroleum hydrocarbon fraction or a sulfiding agent such as dimethylsulfide by circulating the fraction only or the fraction mixed with the sulfiding agent, through the reactor at a temperature of 200° C. or higher.

There is no particular restriction on the reaction mode of the reactor for hydrogenation. However, the reaction mode may be selected from moving bed and fixed bed modes but is preferably a fixed bed mode. The feedstock may be circulated by a down-flow mode or an up-flow mode.

When a gas oil fraction is hydrogenated by the process of the present invention, the resulting extremely low sulfur and aromatic gas oil may be singly used as a gas oil for diesel engines or alternatively may be used in the form of a mixture with any other component such as a base material, as a gas oil for diesel engines.

[Applicability in the Industry]

The hydrogenation catalyst of the present invention can decrease the sulfur compounds of a gas oil fraction to 10 ppm by mass or less because it acts effectively on the sulfur compounds that are poor in reactivity and thus enables desulfurization to proceed to a low sulfur region. Furthermore, the catalyst can decrease the amounts of the nitrogen compounds and aromatic compounds with two or more rings.

[Best Mode for Carrying out the Invention]

The present invention will be described in more details with reference to the following examples but is not limited thereto.

EXAMPLE 1

To 300 g of an aqueous solution of 5 percent by mass of sodium aluminate was added 0.8 g of sodium silicate No. 3, and the mixture was placed in a vessel kept at a temperature of 65° C. A solution was prepared by adding 0.8 g of phosphoric acid (85% concentration) to 300 g of an aqueous solution of 2.5 percent by mass of aluminum sulfate in a separate vessel kept at a temperature of 65° C. and then added dropwise to the aqueous solution containing sodium aluminate. The addition of the solution was stopped when the mixture reached pH 7.0. The resulting slurry product was filtered out thereby obtaining a cake slurry. The cake slurry was placed in a vessel equipped with a reflux condenser and mixed with 90 ml of distilled water and 3 g of a 27 percent ammonia aqueous solution. The mixture was then heated and stirred at a temperature of 80° C. for 24 hours. The slurry was placed in a kneader and kneaded, heating it at a temperature of 80° C. or higher to remove the moisture, thereby obtaining a clay-like kneaded product. The kneaded product was placed in an extruder and then extruded into a cylindrical form with a diameter of 1.5 mm. The resulting cylindrical products were dried at a temperature of 110° C. for one hour and then calcined at a temperature of 550° C. thereby obtaining molded supports. Into an eggplant-type flask were placed 50 g of the resulting molded supports and then charged a solution containing 14.5 g of molybdenum trioxide, 20.0 g of cobalt (II) nitrate hexahydrate, 1.9 g of phosphoric acid(85 percent concentration), and 2.5 g of malic acid, deaerating with a rotary evaporator so that the supports were impregnated with the solution. The impregnated supports were dried at a temperature of 120° C. for one hour and then calcined at a temperature of 550° C., thereby obtaining Catalyst 1. The properties of Catalyst 1 are set forth in Table 1 below.

EXAMPLE 2

Into an eggplant-type flask were placed 50 g of molded support prepared in accordance with the procedures of Example 1, and then charged a solution containing 14.4 g of molybdenum trioxide, 20.0 g of nickel (II) nitrate hexahydrate, 2.0 g of phosphoric acid (85 percent concentration), and 5.0 g of malic acid, deaerating with a rotary evaporator so that the supports were impregnated with the solution. The impregnated supports were dried at a temperature of 120° C. for one hour and then calcined at a temperature of 550° C. thereby obtaining Catalyst 2. The properties of Catalyst 2 are set forth in Table 1 below.

COMPARATIVE EXAMPLE 1

To 300 g of an aqueous solution of 5 percent by mass of sodium aluminate was added 0.8 g of sodium silicate No. 3, and the mixture was placed in a vessel kept at a temperature of 65° C. A aqueous solution of 300 g of a solution of 2.5 percent by mass of aluminum sulfate was prepared in a separate vessel kept at a temperature of 65° C. and then added dropwise to the aqueous solution containing sodium aluminate. The addition of the solution was stopped when the mixture reached pH 7.0. The resulting slurry product was filtered out thereby producing a cake slurry. The cake slurry was placed in a vessel equipped with a reflux condenser and mixed with 90 ml of distilled water and 3 g of a 27 percent ammonia aqueous solution. The mixture was then heated and stirred at a temperature of 80° C. for 24 hours. The slurry was placed in a kneader and kneaded, heating it at a temperature of 80° C. or higher to remove the moisture thereby obtaining a clay-like kneaded product. The kneaded product was placed in an extruder and then extruded into a cylindrical form with a diameter of 1.5 mm. The resulting cylindrical products were dried at a temperature of 110° C. for one hour and then calcined at a temperature of 550° C. thereby obtaining molded supports. Into an eggplant-type flask were placed 50 g of the resulting molded supports and then charged a solution containing 14.5 g of molybdenum trioxide, 20.0 g of cobalt (II) nitrate hexahydrate, 1.9 g of phosphoric acid (85 percent concentration), and 5.0 g of malic acid, deaerating with a rotary evaporator so that the supports were impregnated with the solution. The impregnated supports were dried at a temperature of 120° C. for one hour and then calcined at a temperature of 550° C., thereby obtaining Catalyst 3. The properties of Catalyst 3 are set forth in Table 1 below.

COMPARATIVE EXAMPLE 2

To 300 g of an aqueous solution of 5 percent by mass of sodium aluminate was added sodium silicate No. 3, and the mixture was placed in a vessel kept at a temperature of 65° C. A solution was prepared by adding phosphoric acid (85% concentration) to 300 g of an aqueous solution of 2.5 percent by mass of aluminum sulfate in a separate vessel kept at a temperature of 65° C. and then added dropwise to the aqueous solution containing sodium aluminate. The addition of the solution was stopped when the mixture reached pH 7.0. The resulting slurry product was filtered out thereby obtaining a cake slurry. The cake slurry was placed in a vessel equipped with a reflux condenser and mixed with 90 ml of distilled water and 3 g of a 27 percent ammonia aqueous solution. The mixture was then heated and stirred at a temperature of 80° C. for 12 hours. The slurry was placed in a kneader and kneaded, adding thereto 0.7 g of phosphoric acid (85 percent concentration) and heating it at a temperature of 80° C. or higher to remove the moisture thereby obtaining a clay-like kneaded product. The kneaded product was placed in an extruder and then extruded into a cylindrical form with a diameter of 1.5 mm. The resulting cylindrical products were dried at a temperature of 110° C. for one hour and then calcined at a temperature of 550° C. thereby obtaining molded supports. Into an eggplant-type flask were placed 50 g of the resulting molded supports and then charged a solution containing 14.5 g of molybdenum trioxide, 20.0 g of cobalt (II) nitrate hexahydrate, and 5.0 g of malic acid, deaerating with a rotary evaporator so that the supports were impregnated with the solution. The impregnated supports were dried at a temperature of 120° C. for one hour and then calcined at a temperature of 550° C. thereby obtaining Catalyst 4. The properties of Catalyst 4 are set forth in Table 1 below.

EXAMPLE 3

Catalyst 1, Catalyst 2, and the molded supports of these catalysts thereof were each sufficiently ground in an agate mortar and loaded into an NMR probe so as to measure their $^{31}$P-CPMAS-NMR using Inova 400 manufactured by Varian, Inc. The measurement was carried out by the CP-MAS method under the conditions wherein the magnetic field was 9.4 tesla, the relaxation time was 10 seconds, the pulse angle of 51.2 degrees, and the elapsed time was 0.04 second. The results are also set forth in Table 1.

Figure 2:
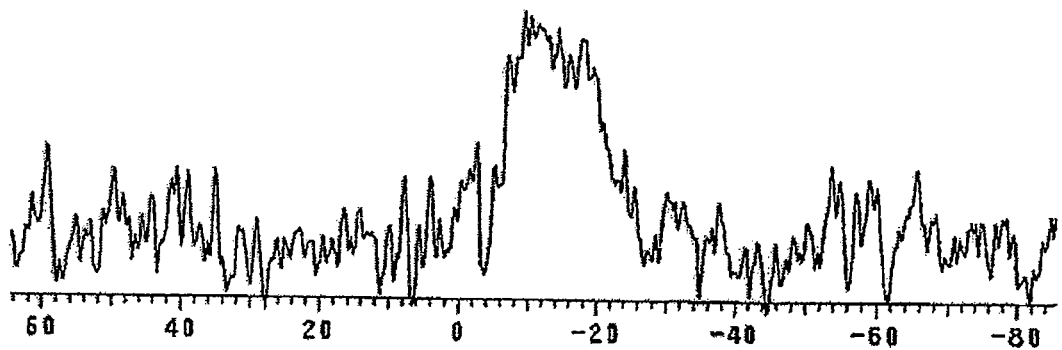
FIG. 2 shows the $^{31}$P-CPMAS-NMR spectra of Catalyst 1.

The $^{31}$P-CPMAS-NMR spectra of Catalyst 1 and the molded support thereof are shown in FIGS. 1 and 2, respectively.

COMPARATIVE EXAMPLE 3

The $^{31}$P-CPMAS-NMR was measured for Catalyst 3, Catalyst 4, and the molded supports of these catalysts in the same procedures of Example 3. The results are set forth in Table 1.

Figure 3:
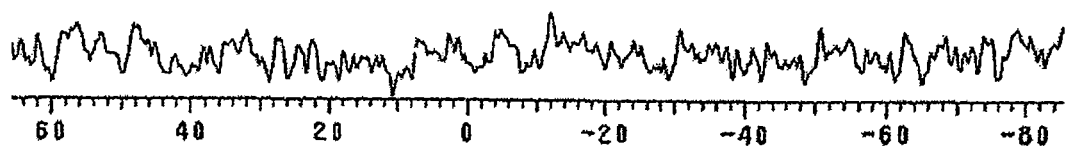
FIG. 3 shows the $^{31}$P-CPMAS-NMR spectra of the molded support of Catalyst 3.

The $^{31}$P-CPMAS-NMR spectrum of the molded support of Catalyst 3 is shown in FIG. 3.

EXAMPLE 4

Catalyst 1 in an amount of 40 ml was loaded into a reactor tube with an inner diameter of 25 mm and then pre-sulfided with a straight gas oil to which dimethyldisulfide had been added such that the sulfur compound concentration was made 3 percent by mass, at an average catalyst layer temperature of 300° C., hydrogen partial pressure of 6 MPa, LHSV of 1 hr$^{-1}$, and hydrogen/oil ratio of 200 NL/L, for 4 hours. After the pre-sulfidization, hydrodesulfurization was carried out by circulating a straight gas oil obtained from a Middle Eastern crude oil (10% recovered temperature: 240° C., 90% recovered temperature: 341° C., content of sulfur compounds: 1.30 percent by mass, content of nitrogen compounds: 200 ppm by mass, content of aromatic compounds with two or more rings: 10.6 percent by volume) at a reaction temperature of 350° C., pressure of 5 MPa, LHSV of 1 hr$^{-1}$, and hydrogen/oil ratio of 200 NL/L. The hydrodesulfurization was carried out, adjusting the reaction temperature, so that the sulfur content of the resulting oil was 10 ppm by mass 40 days after the initiation of circulation of the oil.

The same experiment was carried out for Catalyst 2. The result of the reactivity of each catalyst is set forth in Table 2.

COMPARATIVE EXAMPLE 4

Catalyst 3 in an amount of 100 ml was loaded into a reactor tube with an inner diameter of 25 mm and pre-sulfided under the conditions same as those of Example 4. Thereafter, hydrodesulfurization was conducted under the conditions same as those of Example 4.

The same experiment was carried out for Catalyst 4. The result of the reactivity of Catalyst 4 is set forth in Table 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

TABLE 1

|  | Catalyst 1 | Catalyst 2 | Catalyst 3 | Catalyst 4 |
|---|---|---|---|---|
| Components of Support |  |  |  |  |
| $Al_2O_3$ (mass %) | 92.9 | 92.9 | 98.0 | 98.0 |
| $SiO_2$ (mass %) | 2.1 | 2.1 | 2.0 | 2.0 |
| $P_2O_5$ (mass %) | 5.0 | 5.0 | 0.0 | 6.9 |
| Supported Components |  |  |  |  |
| $MoO_3$ (mass %) | 21.0 | 21.1 | 21.0 | 21.1 |
| CoO (mass %) | 4.0 | 0.0 | 4.3 | 3.9 |
| NiO (mass %) | 0.0 | 3.9 | 0.0 | 0.0 |
| $P_2O_5$ (mass %) | 2.0 | 2.0 | 7.0 | 0.0 |
| Nitrogen Adsorption (BET) |  |  |  |  |
| Pore Volume (ml/g) | 0.47 | 0.45 | 0.48 | 0.46 |
| Surface Area ($m^2/g$) | 275 | 260 | 270 | 280 |
| $^{31}$P-CPMAS-NMR |  |  |  |  |
| Support (ppm) | −9.9 | −10.0 | (not detected) | (not detected) |
| Catalyst (ppm) | −10.2 | −10.1 | (not detected) | (not detected) |

TABLE 2

|  | Example 1 | | Comparative Example 4 | |
|---|---|---|---|---|
| Catalyst | Catalyst 1 | Catalyst 2 | Catalyst 3 | Catalyst 4 |
| Content of Sulfur of Initially Produced Oil (mass ppm) | 3.8 | 3.1 | 12.1 | 18.8 |
| Content of Nitrogen of Initially Produced Oil (mass ppm) | <1 | <1 | 1.2 | 2.0 |
| Content of Aromatic with Two or More Rings of Initially Produced Oil (volume %) | 2.5 | 2.0 | 4.5 | 5.0 |
| Color of Produced Oil with a Sulfur Content of 10 ppm during Constant Operation (ASTM Color) | L0.5 | L0.5 | L1.5 | L1.5 |

We claim:

1. A hydrogenation catalyst for a hydrocarbon oil, comprising an inorganic porous support composed of at least the oxides of aluminum, phosphorus, and silicon, and supporting at least one active metal selected from the metals of Group 8 of the periodic table, at least one active metal selected from the metals of Group 6 of the periodic table, and phosphorus, the phosphorus chemical shift value of the inorganic support determined by $^{31}$P-CPMAS-NMR having the peak within the range of 0 to −20 ppm.

2. The hydrogenation catalyst according to claim 1, wherein the phosphorus chemical shift value of the catalyst determined by $^{31}$P-CPMAS-NMR has the peak within the range of 0 to −20 ppm.

3. The hydrogenation catalyst according to claim 1, wherein the surface area and pore volume of the catalyst sought by the BET method using nitrogen are 295 $m^2$/g or smaller and 0.50 ml/g or smaller, respectively.

4. The hydrogenation catalyst according to claim 1, wherein the content of phosphorus contained in the inorganic porous support is from 0.5 to 10 percent by mass in terms of oxide on the basis of the weight of the support.

5. The hydrogenation catalyst according to claim 1, wherein the total amount of the Group 8 metal and the Group 6 metal supported on the support is 24 percent by mass or more in terms of oxide on the basis of the weight of the catalyst.

6. A process for hydrogenating a hydrocarbon oil, comprising hydrogenating a hydrocarbon oil using the hydrogenation catalyst according to claim 1.

7. The process according to claim 6, wherein the hydrocarbon oil contains a gas oil fraction.

8. The process according to claim 6, wherein the sulfur and nitrogen contents of the resulting oil produced by hydrogenating the hydrocarbon oil are 10 ppm by mass or less and 2 ppm by mass of less, respectively.

9. The process according to claim 6, wherein the content of aromatic compounds having two or more rings of the resulting oil produced by hydrogenating the hydrocarbon oil is 4 percent by volume or less.

* * * * *